No. 736,218. PATENTED AUG. 11, 1903.
J. T. CLARK.
COMBINED POTATO DIGGER AND LISTING PLOW.
APPLICATION FILED MAR. 3, 1903.
NO MODEL.

Witnesses
R. A. Boswell.
George M. Anderson.

Inventor
John T. Clark
By E. W. Anderson
his Attorney

No. 736,218.

Patented August 11, 1903.

UNITED STATES PATENT OFFICE.

JOHN T. CLARK, OF ST. JOSEPH, MISSOURI.

COMBINED POTATO-DIGGER AND LISTING-PLOW.

SPECIFICATION forming part of Letters Patent No. 736,218, dated August 11, 1903.

Application filed March 3, 1903. Serial No. 145,980. (No model.)

*To all whom it may concern:*

Be it known that I, JOHN T. CLARK, a citizen of the United States, and a resident of and whose post-office address is St. Joseph, in the county of Buchanan and State of Missouri, have made a certain new and useful Invention in a Combined Potato-Digger and Listing-Plow; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
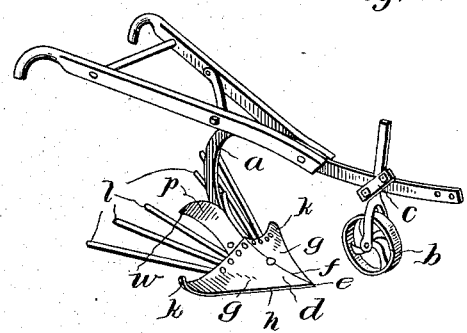
Figure 4:
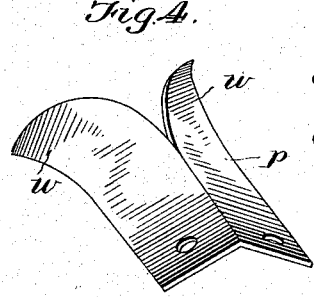
Figure 2:
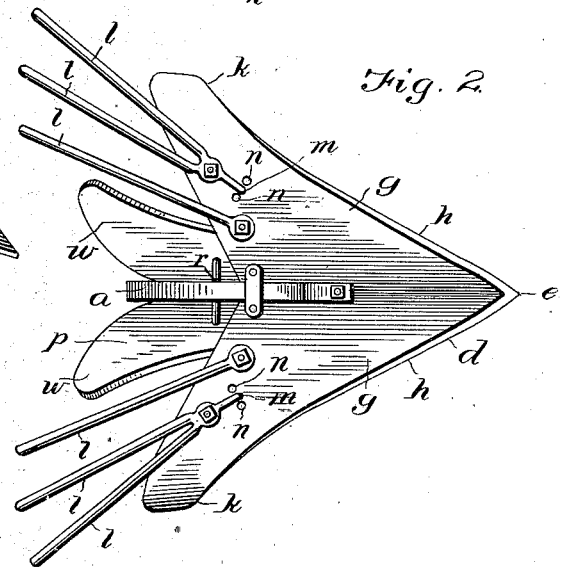
Figure 3:
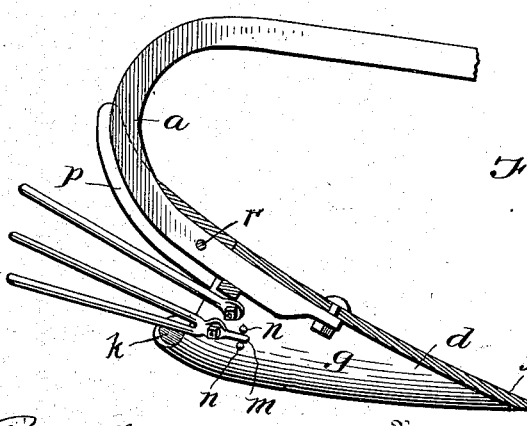

Figure 1 is a perspective view of my invention as applied. Fig. 2 is a bottom plan view of the plowshare and its attachments. Fig. 3 is a central vertical section through the plowshare. Fig. 4 is a detail perspective view of the wings $w$ $w$.

This invention has relation to combined potato-diggers and listing-plows; and it consists in the novel construction and combinations of parts, as hereinafter set forth.

In carrying out this invention it is designed to provide a potato-digger which is capable of separating the potatoes from the soil in which they are grown and depositing such separated potatoes on the surface of the ground; which is so constructed as to cause weeds, grasses, and the like to be deflected in such a manner as to avoid clogging; which is capable of adjustment to conform to the various widths between rows of potatoes to be dug; which is so constructed that by the removal of a small part of the digger and the attachment of an inexpensive device the potato-digger can be easily and quickly converted into a lister-plow, and which is designed in such wise that when used as a lister-plow a sufficient amount of pulverized earth will be formed in the furrow to form subsoil in which to plant seed.

In the accompanying drawings, illustrating the invention, the letter $a$ designates a central downward-curved draft-beam which is similar to that of an ordinary lister-plow. The gage-wheel $b$ for the depth of the work is connected to the beam by means of a yoke-clamp $c$, by which the stem of the gage-wheel is held in a secure but adjustable manner.

The double-faced digger-share $d$ is of angular form, having the point $e$, the median ridge $f$, where the lateral or wing portions $g$ meet, and the horizontal cutting edges $h$ extending from the point obliquely backward and outward to the upward-curved lateral cutting-ears $k$. This digger-share is attached to the downward-curved end of the beam $a$ by suitable bolts. The lateral upward-curved cutting-ears serve as small subcolters, which facilitate materially the action of the share in cutting the earth, thereby not only lightening the draft, but guiding the earth and potatoes toward the sifting-fingers. These sifting-fingers $l$ are secured to the upper and rear portion of the share by means of small bolts. These fingers may be made single or double, as shown, and have each in front of the bolt-hole a terminal upwardly-turned lug or projection $m$, which engages a recess $n$ in the share and serves to fix the position of the finger, although but one bolt is used in securing it to the share. On each side the set of fingers has a lateral inclination outward and upward to the rear, so that as the soil and potatoes pass over the share onto these sets of fingers the earth will be sifted from the potatoes, which are designed to roll and fall from the fingers on the surface of the ground. The fingers may be adjusted to narrower or wider gage by loosening their fastening-bolts and shifting the terminal lugs to other recesses $n$, which are provided for the purpose in the share. The inner fingers are usually single and may be adjusted by changing pivotally the position thereof on their securing-bolts.

To the upper and rear middle angular portion of the share is secured the double moldboard $p$, which is an angular plate having a central rise and the upward and outward curved wings $w$. These moldboard-wings branch upward and outward on each side of the beam and serve to guide the soil and potatoes toward the sifting-fingers. The double moldboard is attached to the share by means of brace-plates and bolts, as at $r$. This double moldboard is made detachable in order to facilitate its exchange for one of larger size, designed to be used when the fingers are removed, the implement being then serviceable as a lister-plow of minimum draft.

In the operation of this potato-digger the soil which is passed up over the share is sifted in broken-up or pulverized condition through the fingers down into the furrow in sufficient quantity to serve as ample subsoil in which to plant seed.

What I claim as my invention, and desire to secure by Letters Patent, is—

1. In a potato-digger, the double-faced angular and pointed share, having the detachable angularly-adjustable sifting-fingers, and the detachable angular double moldboard, substantially as specified.

2. In a potato-digger, the combination with a central downward-curved draft-beam, and a double-faced angular moldboard, having adjustment bolt-holes and recesses, of the sifting-fingers, their attachment-bolts and terminal adjustment-lugs, substantially as specified.

In testimony whereof I affix my signature in presence of two witnesses.

JOHN T. CLARK.

Witnesses:
 JOHN F. ARNOLD,
 GEORGE W. HINTON.